(No Model.)
J. R. STONE.
BAND CUTTER AND FEEDER.
No. 339,119. Patented Mar. 30, 1886.
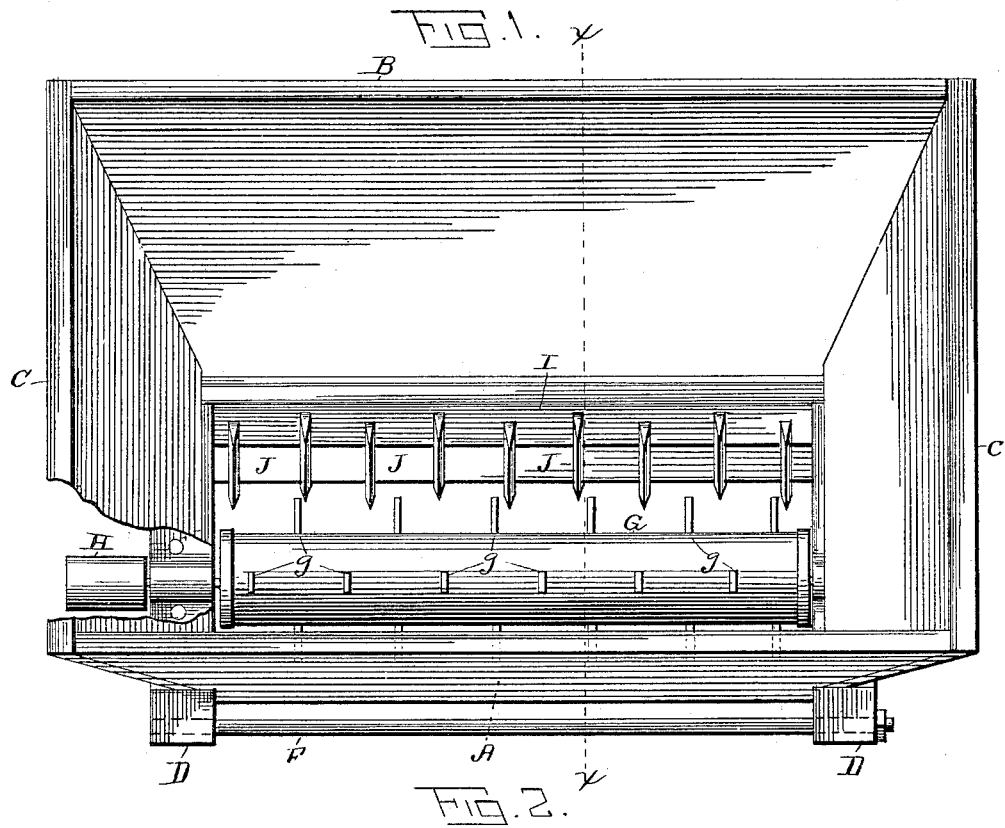
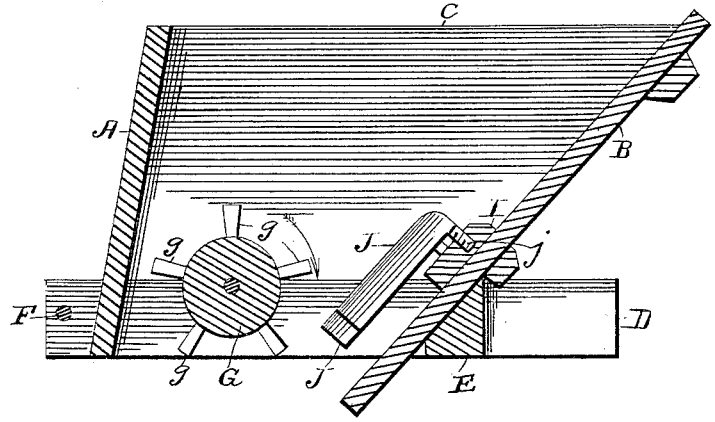
Witnesses:
Norris A. Clark.
R. W. Bishop.
Inventor:
James R. Stone
By his Attorneys:
R. S. & A. P. Lacey

UNITED STATES PATENT OFFICE.

JAMES R. STONE, OF SAMSVILLE, ILL., ASSIGNOR OF THREE-FOURTHS TO THOMAS J. WILHITE, EDMOND S. WILHITE, AND HERMAN WAGNER.

BAND-CUTTER AND FEEDER.

SPECIFICATION forming part of Letters Patent No. 339,119, dated March 30, 1886.

Application filed October 5, 1885. Serial No. 179,053. (No model.)

*To all whom it may concern:*

Be it known that I, JAMES R. STONE, a citizen of the United States, residing at Samsville, in the county of Edwards and State of Illinois, have invented certain new and useful Improvements in Band-Cutters and Feeders; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to band-cutters and feeders for thrashing-machines; and it consists in the novel features hereinafter set forth and claimed.

In the drawings, Figure 1 is a plan view of my band-cutter with a portion of the side of the hopper broken away. Fig. 2 is a section on the line $x$ $x$ of Fig. 1.

The object of the invention is to produce a simple, cheap, and durable attachment which may be readily applied to any thrashing-machine, whereby sheaves of grain fed thereto through my improved device will have the band cut and the grain loosened and spread, thus lessening the work of the thrasher, which will in a given time thrash out a greater quantity of grain.

The hopper consists of the front and rear walls, A and B, respectively, and the side pieces, C, suitably joined together. The rear wall is set at a steep incline to form a chute for the grain. The lower ends of the sides of the hopper are strengthened by side bars, D, united by a bar, E, in the rear of the wall B, and by a bolt or rod, F, forward of the wall A.

Between the bars D a roller or cylinder, G, is located, the journals of which find bearings in the bars. One of these journals extends beyond the bar, and is provided with a band-pulley, H. This roller is mounted to one side of the center of the opening in the bottom of the hopper, and is provided with rows of teeth $g$, the teeth of one row being set to come intermediate of the teeth of the adjacent rows. At the opposite side a knife-bar, I, is removably attached to the inner lower portion of the wall B, and is provided with inclined blades or cutters J, affixed thereto so as to be in substantially the same horizontal plane as the toothed roller in any well-known manner, but preferably by threaded stems $j$, projecting at right angles from the upper rear portion of the blades, each alternate one being set in a higher plane than the intermediate ones, so as to break joints and prevent splitting the knife-bar.

In practice the roller G is revolved over toward the knives, as shown by the arrow. By motion being imparted to the band-wheel H a sheaf of grain fed thereto down the chute formed by the wall B will be fed forward by the spikes of the roller, and the elastic sheaf being brought forcibly against the knives or blades will be compressed and the band severed, and the grain will be spread by reason of the elasticity of the straw thus released, while the knives will serve as so many feeding-ribs.

Having thus described my invention, what I claim, and desire to secure by Letters Patent, is—

The herein-described band-cutter and grain-feeder comprising a hopper, a series of downwardly-inclined knives secured therein at one side, and a toothed roller journaled opposite to and in substantially the same horizontal plane with the knives, whereby the sheaf is compressed directly against the knives and the band cut by the pressure and traction, substantially as set forth.

In testimony whereof I affix my signature in presence of two witnesses.

JAMES R. STONE.

Witnesses:
OSCAR SWARTZBAUGH,
LYDIA A. TIETZE.